(No Model.) 2 Sheets—Sheet 1.
C. F. POLLAK.
APPARATUS FOR PREPARING ELECTRIC ACCUMULATOR PLATES.
No. 431,617. Patented July 8, 1890.

WITNESSES:
John Becker
Fred White

INVENTOR:
Charles Francis Pollak,
By his Attorneys,
Arthur C. Fraser &c

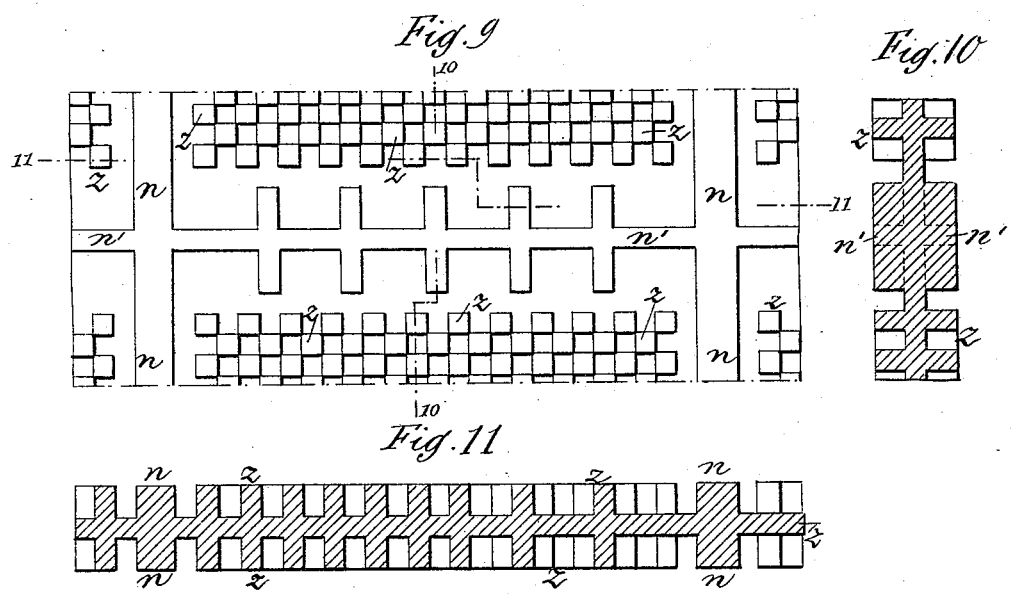

//UNITED STATES PATENT OFFICE.

CHARLES FRANCIS POLLAK, OF PARIS, FRANCE.

APPARATUS FOR PREPARING ELECTRIC ACCUMULATOR-PLATES.

SPECIFICATION forming part of Letters Patent No. 431,617, dated July 8, 1890.

Application filed November 14, 1889. Serial No. 330,345. (No model.) Patented in France May 9, 1888, No. 190,518; in Germany December 28, 1888, No. 49,636, and in England May 3, 1889, No. 7,428.

*To all whom it may concern:*

Be it known that I, CHARLES FRANCIS POLLAK, a subject of the Emperor of Austria, residing in Paris, France, have invented certain new and useful Improvements in Apparatus for Preparing Electric Accumulator-Plates, of which the following is a specification.

This invention is the subject of patents in France, No. 190,518, dated May 9, 1888; in Germany, No. 49,636, dated December 28, 1888, and in Great Britain, No. 7,428, dated May 3, 1889.

The present application for patent has for its object an apparatus for preparing plates for electric accumulators. The plates are prepared by forming mechanically grooves or hollows on one or both faces of sheets of lead by passing them between two cylinders formed of toothed disks or of disks alternately plain and toothed, in order that the sheet of lead shall be formed on one or both of its faces with hollows or recesses of a width and depth sufficient for receiving and holding the spongy lead.

Figure 1:
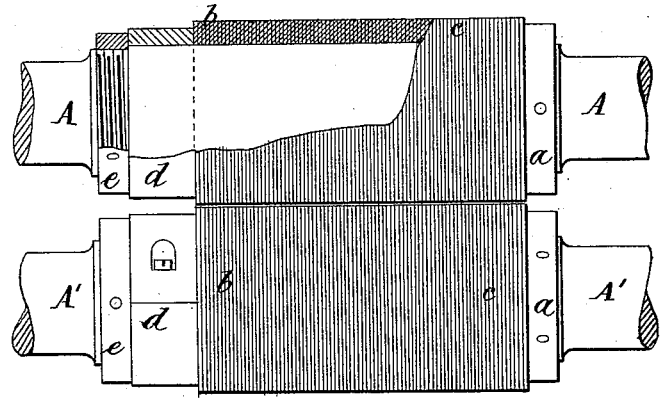
Figure 2:
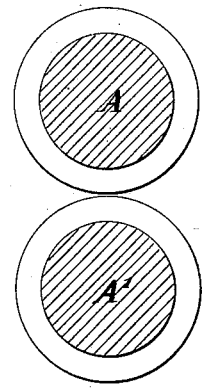
Figure 3:
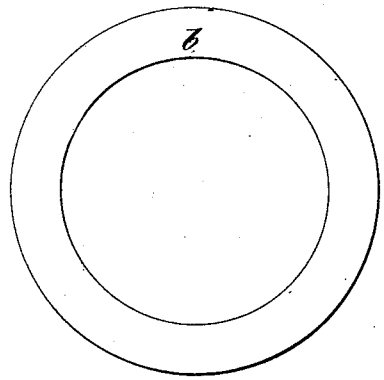
Figure 5:
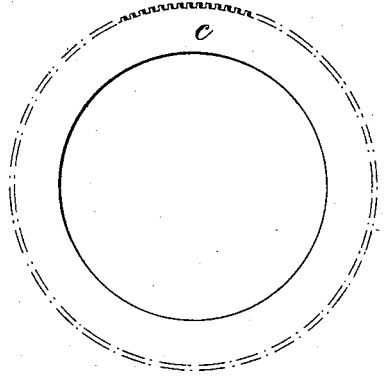
Figure 4:
Figure 6:
Figure 7:
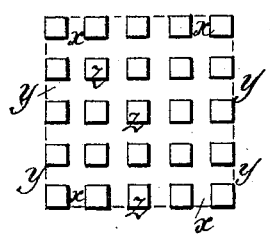
Figure 8:
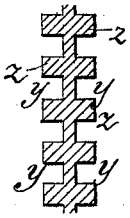

Figure 1 of the accompanying drawings is a front view of a pair of laminated rollers for preparing accumulator-plates of the character described. Fig. 2 is a transverse section thereof. Figs. 3 and 4 are respectively a face view and a transverse section of one of the plain or untoothed disks employed in building up these laminated rollers, and Figs. 5 and 6 are respectively a face view and a transverse section of one of the toothed disks thereof. Figs. 7 and 8 are respectively a face view and a transverse section, on a larger scale, of a fragment of an accumulator-plate formed by passing between the rollers shown in Figs. 1 and 2. Figs. 9, 10, and 11 are views of a fragment of an accumulator-plate formed by means of a variation of the arrangement of the rollers, Fig. 9 being a face view, Fig. 10 a transverse section on the line 10 10, and Fig. 11 a longitudinal transverse section on the line 11 11 in Fig. 9.

Referring to Figs. 1 and 2, A A' designate the shafts or arbors of the two indenting-rollers. Each of these shafts has a collar $a$ fixed upon it, against which are pressed the disks or washers $b$ $c$. (Shown separately in Figs. 3 and 5.) The disks $c$ are toothed, with preferably square teeth, as shown in Fig. 5, while the disks $b$ are plain or devoid of teeth, being preferably of the same diameter as the exterior of the teeth of the disks $c$. These disks are assembled in alternation and placed upon the arbors A A', so that thereby laminated rollers are built up, presenting notches at intervals formed by the spaces between the teeth of the disks $c$. The disks are pressed tightly against the collars $a$ by screw-nuts or collars $e$, acting against them through divided collars $d$. When after having been in use for a certain time the cavities in the rollers become partly choked with lead, they may be readily cleaned by removing the divided collars $d$ and separating the disks $b$ $c$, whereby the particles of lead adhering in the notches may be readily detached, after which the collars $d$ may be replaced and the disks pressed tightly together again by means of the screws $e$. By passing sheets or plates of lead between the indented rollers thus constructed the surfaces of the plates are formed with longitudinal grooves or depressions $x$ $x$, as shown in Fig. 7, corresponding to the plain disks $b$, and with transverse notches or depressions $y$ $y$, corresponding to the teeth on the disks $c$. These depressions may be in line with one another, as shown in Fig. 7, if care be taken to arrange the disks $c$ with their teeth in the same longitudinal lines, or they may be disposed in different positions, according to the accidental arrangement of the disks $c$.

Between the respective grooves $x$ and depressions $y$ there are formed salient portions or projections $z$ $z$, which project sufficiently to cause them to engage and retain the spongy lead, which is subsequently deposited upon the surface of the lead plates. These projections also increase the extent of surfaces of contact between the spongy lead and the lead plates, which serve as the cores or bases for the spongy lead. In case the indenting-rollers are formed entirely of toothed disks $c$ $c$, the plate on being passed between them is formed with projections or teeth in relief in two contiguous lines, as shown in Fig. 9; but care should be taken to alternate the teeth of the successively-contiguous disks in order that the indentations and projections of the lead plate may be formed in alternation, as shown in Fig. 9.

In order to strengthen the lead plates, it is desirable to form them at intervals with ribs $n\ n'$, as shown in Figs. 9, 10, and 11. This is done by omitting certain teeth of the disks $c\ c$, whereby the transverse ribs are formed, and by interposing plain disks $b\ b$ of slightly smaller diameter than the disks $c\ c$, whereby the longitudinal ribs are formed.

In order to indent a lead plate on only one side, it is passed between rollers, one of which has a plain surface, and the other of which is constructed of toothed disks or laminæ in the manner described with reference to Figs. 1 to 6.

I claim as my invention the following-defined novel features or improvements, substantially as hereinbefore specified, namely:

1. An apparatus for preparing indented accumulator-plates, consisting of a pair of pressure-rollers, one or both of which are constructed of an arbor on which are assembled toothed disks, in substantially the manner described.

2. An apparatus for preparing indented accumulator-plates, consisting of a pair of pressure-rollers, one or both of which are constructed of an arbor on which are assembled disks alternately plain and toothed, substantially as described.

In witness whereof I have hereunto signed my name in the presence of two subscribing witnesses.

CHARLES FRANCIS POLLAK.

Witnesses:
R. J. PRESTON,
MICHEL COQUORT.